(12) United States Patent
Sasaki

(10) Patent No.: US 12,422,574 B2
(45) Date of Patent: Sep. 23, 2025

(54) RADIATION IMAGING APPARATUS AND RADIATION IMAGING SYSTEM

(71) Applicant: CANON KABUSHIKI KAISHA, Tokyo (JP)

(72) Inventor: Yoshito Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 18/160,255

(22) Filed: Jan. 26, 2023

(65) Prior Publication Data

US 2023/0236330 A1 Jul. 27, 2023

(30) Foreign Application Priority Data

Jan. 26, 2022 (JP) ................. 2022-010276

(51) Int. Cl.
*G01T 1/20* (2006.01)
*G01T 1/202* (2006.01)

(52) U.S. Cl.
CPC .......... *G01T 1/20188* (2020.05); *G01T 1/202* (2013.01)

(58) Field of Classification Search
CPC .............................. G01T 1/20188; G01T 1/202
See application file for complete search history.

(56) References Cited

U.S. PATENT DOCUMENTS

| | | | |
|---|---|---|---|
| 2004/0245474 A1 | 12/2004 | Vieux et al. | |
| 2011/0121185 A1 | 5/2011 | Hirai | |
| 2012/0112075 A1* | 5/2012 | Noda | G01T 1/2002 |
| | | | 250/361 R |
| 2020/0379130 A1* | 12/2020 | Hoshina | G01T 1/2006 |

FOREIGN PATENT DOCUMENTS

JP H11345956 A 12/1999
JP 2005506552 A 3/2005

* cited by examiner

*Primary Examiner* — Mark R Gaworecki
(74) *Attorney, Agent, or Firm* — Canon U.S.A., Inc. IP Division

(57) ABSTRACT

A radiation imaging apparatus includes a scintillator layer configured to convert radiation into light, a supporting base configured to support the scintillator layer, a sensor panel including a plurality of photoelectric conversion elements arranged in a two-dimensional array, and a substrate, and the radiation imaging apparatus includes a sealing portion configured to seal the sensor panel and the scintillator layer in a space formed between the substrate and the supporting base, wherein the supporting base is made of metal, and a main material of the supporting base is same as a main material of the substrate.

12 Claims, 16 Drawing Sheets

RADIATION IMAGING APPARATUS AND RADIATION IMAGING SYSTEM

BACKGROUND

Field

The present disclosure relates to a radiation imaging apparatus and a radiation imaging system.

Description of the Related Art

In recent years, radiation imaging apparatuses have been commercially available. In such a radiation imaging apparatus, a plurality of photoelectric conversion elements is formed on the front surface of a sensor panel, and a scintillator layer for converting radiation, such as an X-ray, into light having a wavelength detectable by the photoelectric conversion elements is stacked on the sensor panel.

The scintillator layer of the radiation imaging apparatus may be made of a material having deliquescence. In this case, there are cases in which moisture prevention is achieved for the scintillator layer by sealing the peripheral area of these components with resin when a supporting base supporting the scintillator layer is attached to the sensor panel. In this structure, if there is a great difference in thermal expansion coefficient between the supporting base supporting the scintillator layer and the sensor panel, for example, warpage could be caused, the layers could be peeled from each other, or the sealing resin could be damaged due to the difference in thermal expansion coefficient.

In order to prevent these problems, there has conventionally been proposed a technique of providing a base indicating the same thermal expansion coefficient as that of a sensor panel and sealing the scintillator in the space formed by the base, the sensor panel, and resin.

However, with the structure discussed in Japanese Unexamined Patent Application Publication (Translation of PCT Application) No. 2005-506552, the base absorbs the radiation that has passed through a subject, and the quality of a consequently obtained radiation image may be deteriorated. In addition, because this structure is more complex, the apparatus cost and weight may be increased.

SUMMARY

The present disclosure has been made in view of these problems with conventional techniques described above and is directed to a radiation imaging apparatus that can acquire high-quality radiation images at low cost and with a simple structure while ensuring the moisture resistance of the scintillator.

According to an aspect of the present disclosure, a radiation imaging apparatus includes a scintillator layer configured to convert radiation into light, a supporting base configured to support the scintillator layer, a sensor panel including a plurality of photoelectric conversion elements arranged in a two-dimensional array, and a substrate, and the radiation imaging apparatus includes a sealing portion configured to seal the sensor panel and the scintillator layer in a space formed between the substrate and the supporting base, wherein the supporting base is made of metal, and a main component of the supporting base is same as a main component of the substrate.

A linear expansion coefficient of the supporting base may be in a range from $10 \times 10^{-6}$K to $30 \times 10^{-6}$K.

The substrate and the sensor panel may not be bonded to each other.

The radiation imaging apparatus may further include a stress relaxation layer between the substrate and the sensor panel. The stress relaxation layer may be configured to relax stress caused between the substrate and the sensor panel.

The sensor panel may have flexibility.

The sensor panel may be made of polyimide.

The scintillator layer may be fixed to the supporting base.

The scintillator layer may be fixed to the sensor panel.

Aluminum may be a main material of the supporting base.

The scintillator layer may be made of cesium iodide.

The sealing portion may be made of resin.

The resin may be epoxy resin.

A radiation imaging system may include the radiation imaging apparatus, a signal processing unit configured to process a signal from the radiation imaging apparatus, and a display unit configured to display a signal from the signal processing unit.

Further features of the present disclosure will become apparent from the following description of exemplary embodiments with reference to the attached drawings.

DESCRIPTION OF THE EMBODIMENTS

Figure 1:
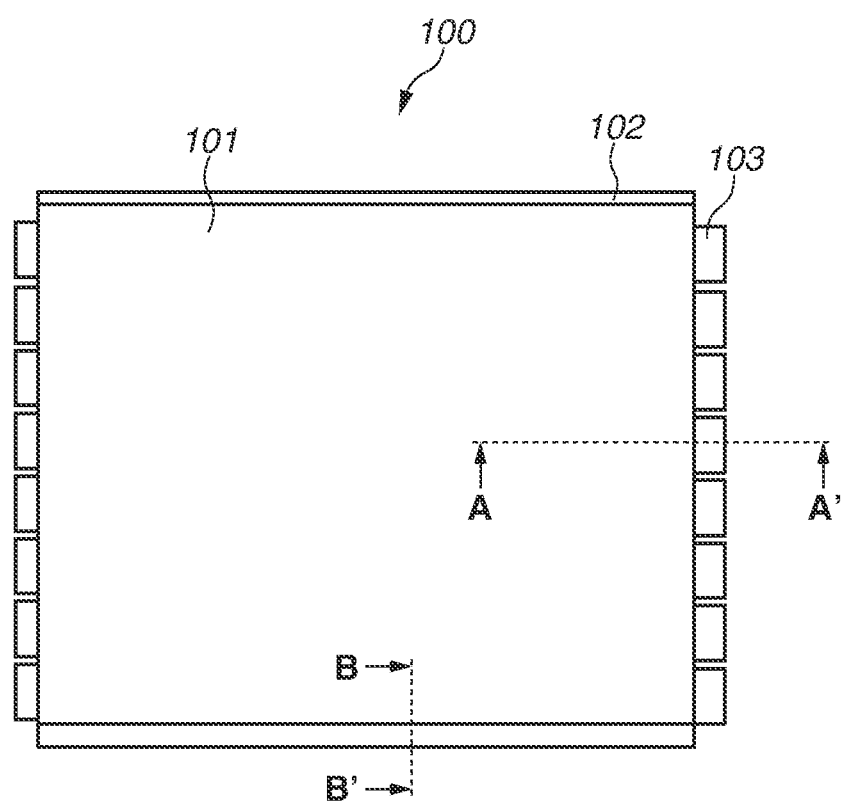
FIG. 1 is a plan view illustrating a structure of a radiation imaging apparatus according to an exemplary embodiment of the present disclosure.

A suitable exemplary embodiment of the present disclosure will be described with reference to the attached drawings. In the individual drawings, the same components are denoted by the same reference numerals, and redundant description will be avoided.

Figure 2:
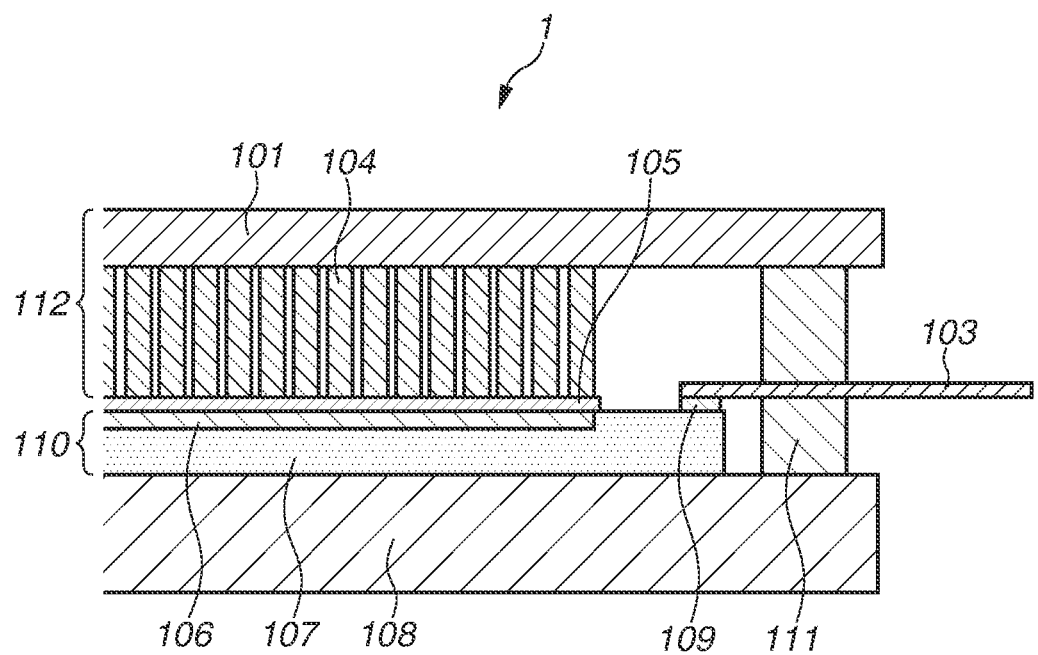
FIG. 2 is a sectional view illustrating the structure of the radiation imaging apparatus according to the exemplary embodiment of the present disclosure.
Figure 3:
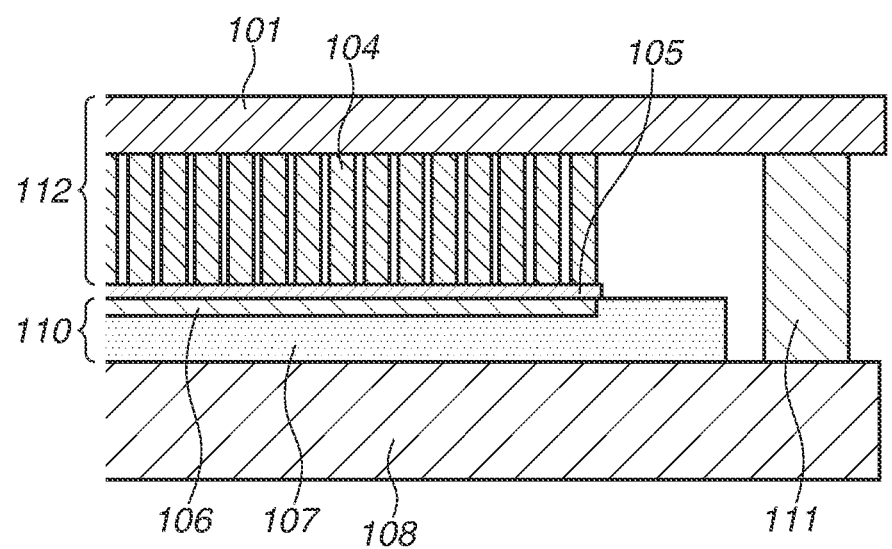
FIG. 3 is another sectional view illustrating the structure of the radiation imaging apparatus according to the exemplary embodiment of the present disclosure.

FIG. 1 is a schematic plan view illustrating a structure of a radiation imaging apparatus 1 according to an aspect of the present disclosure. FIG. 2 is a sectional view of the radiation imaging apparatus 1 taken along a line A-A' in FIG. 1. FIG. 3 is a sectional view of the radiation imaging apparatus 1 taken along a line B-B' in FIG. 1.

The radiation imaging apparatus 1 includes photoelectric conversion elements and a scintillator layer 104 configured to convert radiation into light having a wavelength detectable by the photoelectric conversion elements. While the radiation is preferably an X-ray, a different kind of radiation may alternatively be used. Examples of the radiation include electromagnetic waves such as an α-ray, a β-ray, and a γ-ray. As illustrated in FIGS. 1 to 3, the radiation imaging apparatus 1 includes the scintillator layer 104 and a sensor panel 110, which are stacked on top of each other.

The sensor panel 110 includes a photoelectric conversion unit 106 and a sensor base 107. The photoelectric conversion unit 106 is formed on a first surface of the sensor base 107. A sensor protection layer (not illustrated) may be formed on the sensor panel 110.

In FIG. 2, the photoelectric conversion unit 106 is formed by arranging the photoelectric conversion elements and thin film transistor (TFT) switching elements (not illustrated) in a two-dimensional array, and the sensor panel 110 is structured by disposing the photoelectric conversion unit 106 on the insulating sensor base 107 made of glass or the like. Anisotropic conductive film (ACF) 109 is used to electrically connect external wirings 103 and the sensor base 107.

The sensor base 107 of the sensor panel 110 may be made of a flexible material, e.g., resin such as polyimide. Alternatively, the sensor panel 110 may be formed by disposing the photoelectric conversion unit 106 on the sensor base 107 made of silicon. A plurality of sensor panels 110 may be fixed on a single base.

A sensor protection layer (not illustrated) may be formed to cover the photoelectric conversion unit 106. In a case where such a sensor protection layer is formed, the sensor protection layer may be made of SiN, TiO2, LiF, Al2O3, or MgO, for example. The sensor protection layer may be made of polyphenylene sulfide resin, fluorine resin, polyether ether ketone resin, liquid crystal polymer, polyether nitrile resin, polysulfone resin, polyethersulfone resin, or polyarylate resin, for example.

The sensor protection layer may be made of polyamide-imide resin, polyetherimide resin, polyimide resin, epoxy resin, silicon resin, acrylic resin, or a composite containing any one of these kinds.

Because the light converted by the scintillator layer 104 passes through the sensor protection layer when radiation is emitted to the radiation imaging apparatus 1, the sensor protection layer is preferably made of a material having a high transmittance with respect to the wavelength of the light converted by the scintillator layer 104.

Next, a scintillator supporting base 101 will be described. The scintillator supporting base 101 is made of a material having a high transmittance with respect to the radiation. For example, the scintillator supporting base 101 is made of at least one of beryllium (Be), magnesium (Mg), aluminum (Al), titanium (Ti), iron (Fe), and an alloy containing at least one of the above elements as its main component.

The scintillator layer 104 is formed on the scintillator supporting base 101. A base protection layer (not illustrated) may be formed on the scintillator supporting base 101, and in this case, the scintillator layer 104 is disposed via the base protection layer. A reflection layer for effectively utilizing the light converted by the scintillator layer 104 may be disposed on the scintillator supporting base 101. Such a reflection layer is preferably made of a material having a high reflectance with respect to the light converted by the scintillator layer 104. For example, the reflection layer is made of silver (Ag) or aluminum (Al).

Figure 4:
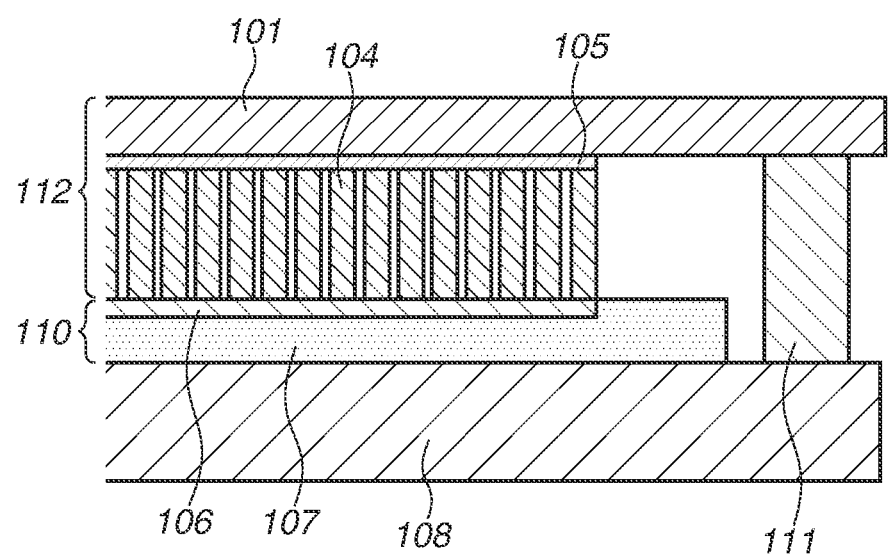
FIG. 4 is a sectional view illustrating another configuration of the radiation imaging apparatus according to the exemplary embodiment of the present disclosure.

The scintillator layer 104 is made of a columnar crystal scintillator as typified by cesium iodide (CsI:Tl) to which a slight amount of thallium (Tl) has been added, for example. The scintillator layer 104 may be formed by performing direct vapor deposition on the scintillator supporting base 101. In this case, the sensor panel 110 and the scintillator are bonded to each other via an adhesion layer 105. The scintillator layer 104 may be directly vapor-deposited on the sensor panel 110 as illustrated in FIG. 4, and in this case, the scintillator supporting base 101 and the scintillator layer 104 are bonded to each other via the adhesion layer 105.

A scintillator protection layer (not illustrated) may be disposed to cover the front and side surfaces of the scintillator layer 104. The scintillator protection layer has a function of protecting the scintillator layer 104 from being deteriorated by humidity (moisture resistance or humidity resistance). For example, a general organic material such as silicon resin, acrylic resin, or epoxy resin may be used as a material of the scintillator protection layer. Other examples of the material of the scintillator protection layer include hot-melt resin such as polyester resin, polyolefin resin, and polyamide resin.

It is suitable that the scintillator protection layer be made of resin having a low moisture transmission rate. For example, the scintillator protection layer is an organic layer made of polyparaxylylene and is formed by chemical vapor deposition (CVD) or may be made of hot-melt resin as typified by polyolefin resin. As a temporary protection film for achieving moisture prevention, the scintillator protection film may be a protection film made of metal atoms, oxygen atoms, and a hydrophobic functional group.

For the scintillator layer 104, the scintillator protection film achieves a moisture prevention function of preventing moisture intrusion from the outside and a shock prevention function of preventing destruction by shock. In a case where the scintillator layer 104 is made of a scintillator having a columnar crystal structure, it is preferable that the scintillator protection film have a thickness of 10 nm to 50 μm.

The scintillator layer 104 is sealed in the space formed by the scintillator supporting base 101, a substrate 108, and the sealing portion 111. The peripheral portion of the scintillator supporting base 101 and the peripheral portion of the substrate 108 are bonded and combined to each other by the sealing portion 111. To improve the moisture resistance of the scintillator layer 104, as is the case with the scintillator protection layer, it is desirable that the sealing portion 111 be made of resin having a low moisture transmission rate. In particular, it is desirable that the sealing portion 111 be made of epoxy resin.

The resin used for the sealing portion 111 may be changed depending on the moisture resistance of the scintillator protection layer. For example, in a case where the scintillator protection layer is made of a material having a high moisture resistance, the sealing portion 111 may be made of resin having a relatively high moisture transmission property. For example, the sealing portion 111 may be made of silicon resin, acrylic resin, or flexible epoxy resin.

The substrate 108 is disposed on a second surface of the sensor panel 110, the second surface being opposite to a first surface of the sensor panel 110. The substrate 108, the sealing portion 111, and the scintillator supporting base 101 form a moisture prevention structure. It is desirable that the substrate 108 be made of a material indicating approximately the same thermal expansion coefficient as that of the scintillator supporting base 101. Thus, it is desirable that the substrate 108 be made of a material of the same element as that of the scintillator supporting base 101.

The substrate 108 and the scintillator supporting base 101 are made of a metal material. It is preferable that a material of which the value of the linear expansion coefficient representing change in length among the thermal expansion coefficients is in the range from $10 \times 10^{-6}$ K to $30 \times 10^{-6}$ K be used.

In the case of the radiation imaging apparatus 1 having the above-described sealing structure, the sensor base 107 and the substrate 108 are not bonded to each other. With this structure, even if the sealing portion 111 is made of hard sealing resin, it is possible to reduce the risk of causing a crack in the sealing portion 111 due to the thermal expansion difference between the substrate 108 and the scintillator supporting base 101. The present exemplary embodiment has an advantageous effect of reducing warpage of the radiation imaging apparatus 1 and peeling of the scintillator supporting base 101 and the scintillator layer 104.

Figure 5:
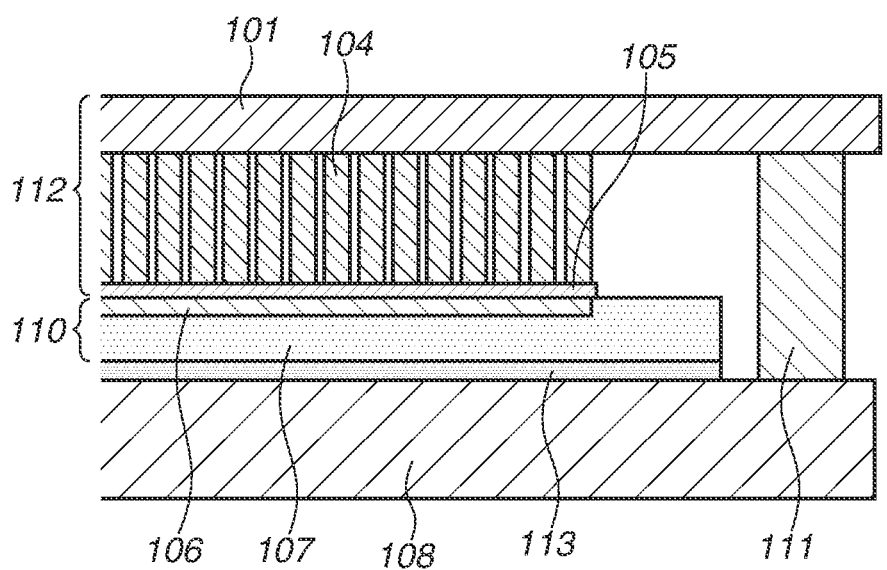
FIG. 5 illustrates a configuration of a stress relaxation layer of the radiation imaging apparatus according to the exemplary embodiment of the present disclosure.
Figure 6:
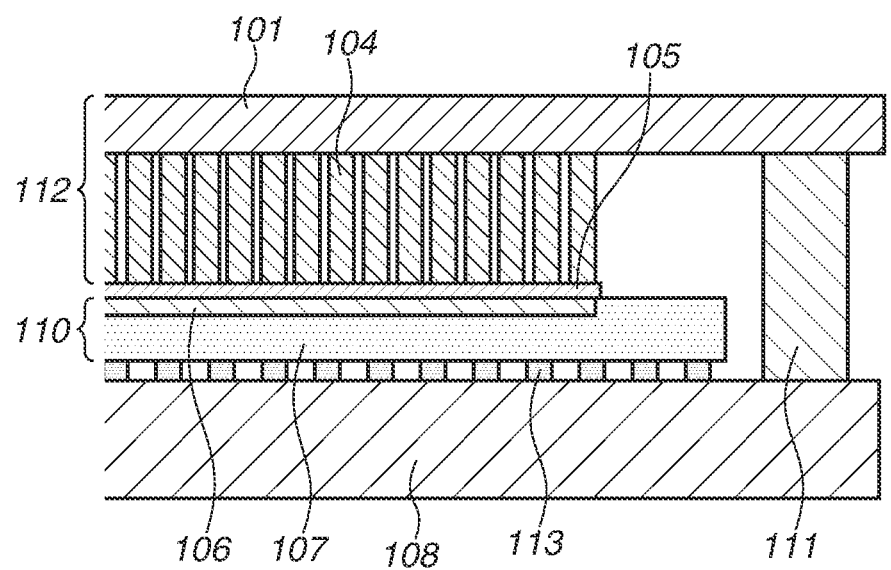
FIG. 6 illustrates another configuration of the stress relaxation layer of the radiation imaging apparatus according to the exemplary embodiment of the present disclosure.
Figure 7:
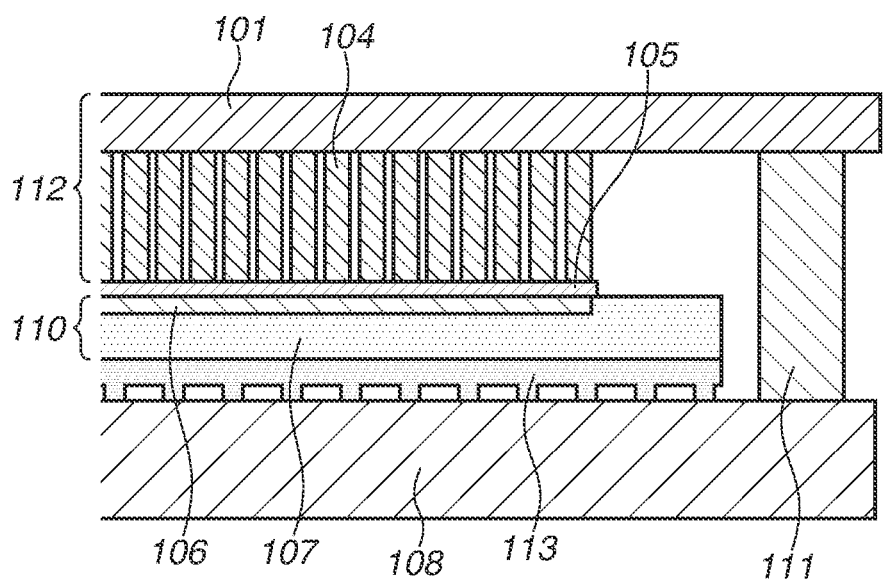
FIG. 7 illustrates another configuration of the stress relaxation layer of the radiation imaging apparatus according to the exemplary embodiment of the present disclosure.
Figure 8:
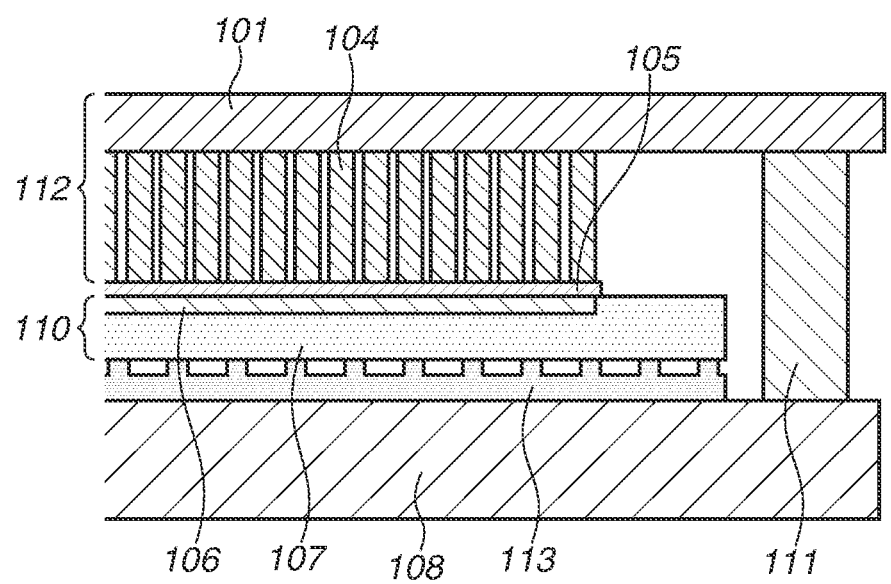
FIG. 8 illustrates another configuration of the stress relaxation layer of the radiation imaging apparatus according to the exemplary embodiment of the present disclosure.
Figure 9:
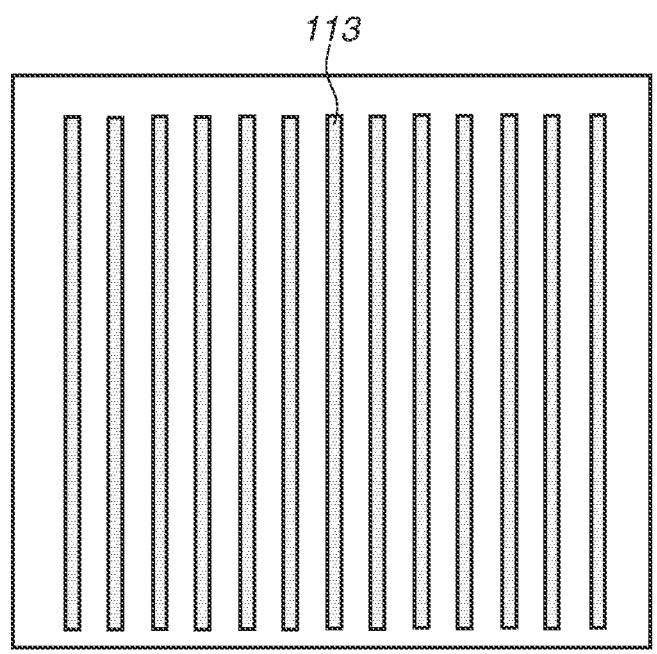
FIG. 9 illustrates another configuration of the stress relaxation layer of the radiation imaging apparatus according to the exemplary embodiment of the present disclosure.
Figure 10:
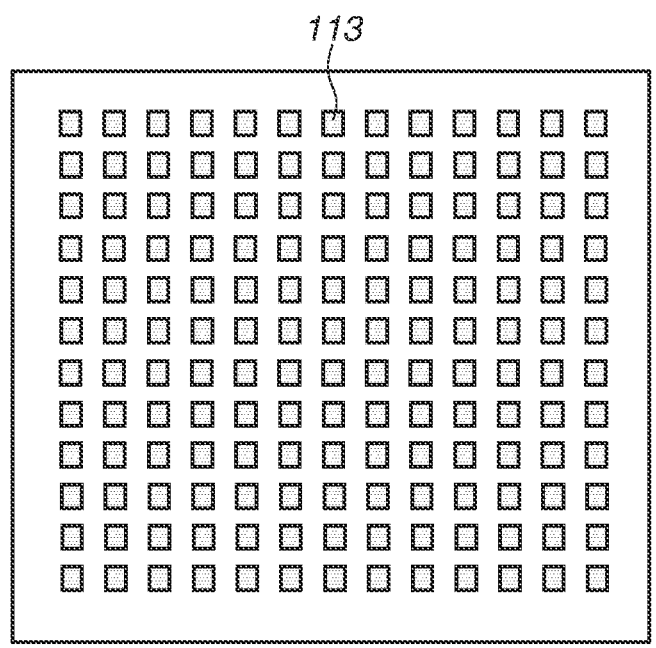
FIG. 10 illustrates another configuration of the stress relaxation layer of the radiation imaging apparatus according to the exemplary embodiment of the present disclosure.
Figure 11:
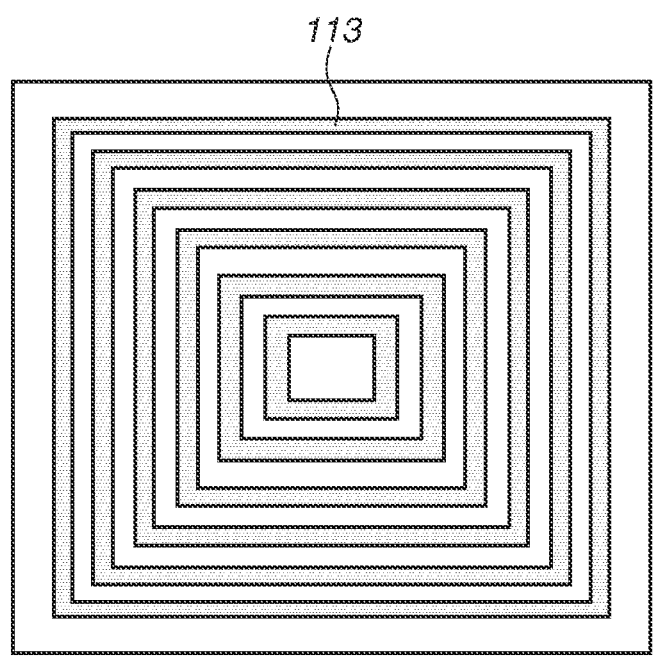
FIG. 11 illustrates another configuration of the stress relaxation layer of the radiation imaging apparatus according to the exemplary embodiment of the present disclosure.
Figure 12:
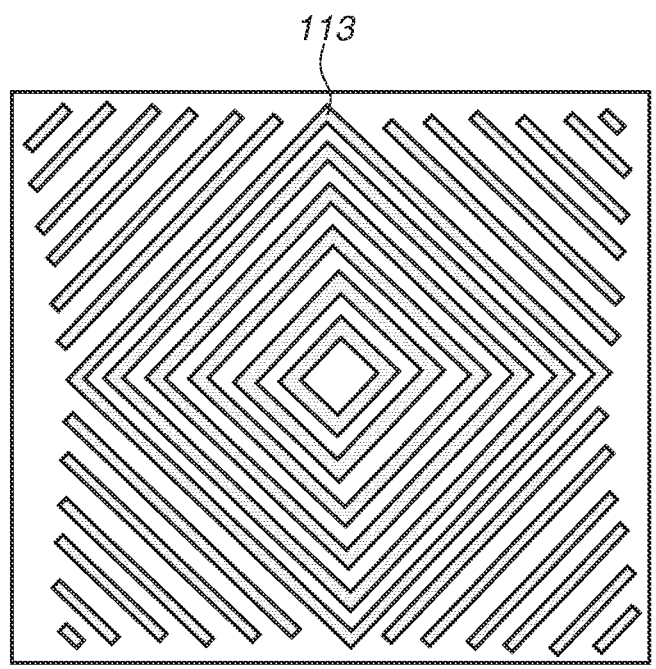
FIG. 12 illustrates another configuration of the stress relaxation layer of the radiation imaging apparatus according to the exemplary embodiment of the present disclosure.
Figure 13:
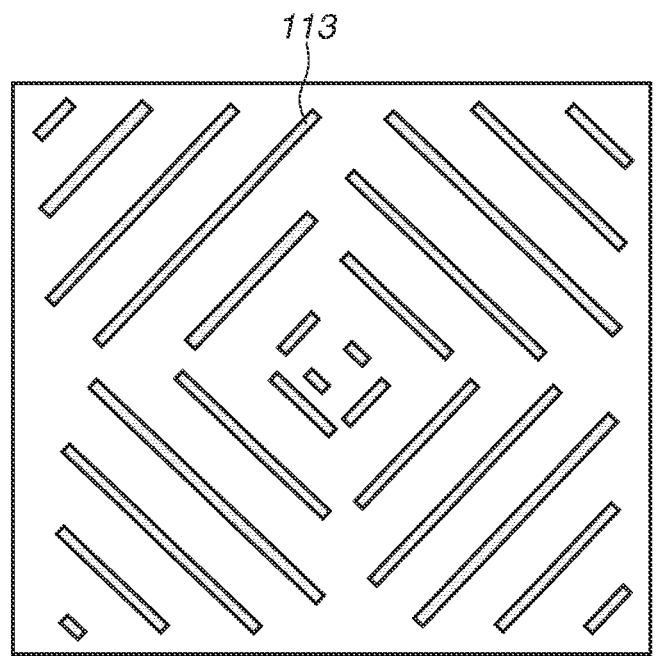
FIG. 13 illustrates another configuration of the stress relaxation layer of the radiation imaging apparatus according to the exemplary embodiment of the present disclosure.

Because it is important to relax the stress between the sensor base 107 and the substrate 108 caused by the thermal expansion difference, a stress relaxation layer 113 may be formed between the sensor base 107 and the substrate 108, as illustrated in FIG. 5. The stress relaxation layer 113 may be formed of a single layer or a plurality of layers. As long as the stress relaxation layer 113 is disposed between the sensor base 107 and the substrate 108, the size or shape of the stress relaxation layer 113 is not particularly limited. For example, the stress relaxation layer 113 may be disposed on the entire photoelectric conversion unit 106 as illustrated in FIG. 5. Alternatively, as illustrated in FIGS. 6 to 8, the stress relaxation layer 113 may be disposed to be partly in contact with the sensor base 107 and the substrate 108.

While FIGS. 9 to 13 are plan views and illustrate various patterns of the shape of the stress relaxation layer 113, the shape of the stress relaxation layer 113 is not limited to these examples, as long as the stress caused between the sensor base 107 and the substrate 108 can be relaxed.

It does not matter whether the stress relaxation layer 113 is bonded to the sensor base 107 or the substrate 108. In a case where an adhesion layer is formed between the stress relaxation layer 113 and the sensor base 107 and in a case where one side of the stress relaxation layer is bonded, for example, a coating film or a sheet having a good sliding property may be formed on the substrate 108. In this way, transfer of the stress is effectively relaxed.

While the stress relaxation layer 113 is suitably made of silicon resin, the stress relaxation layer 113 may be made of any known material that can be used to achieve a buffering effect.

Specific characteristics of the radiation imaging apparatus 1 according to the present exemplary embodiment will be described based on comparative examples and the present exemplary embodiment.

Comparative Example 1

Figure 14:
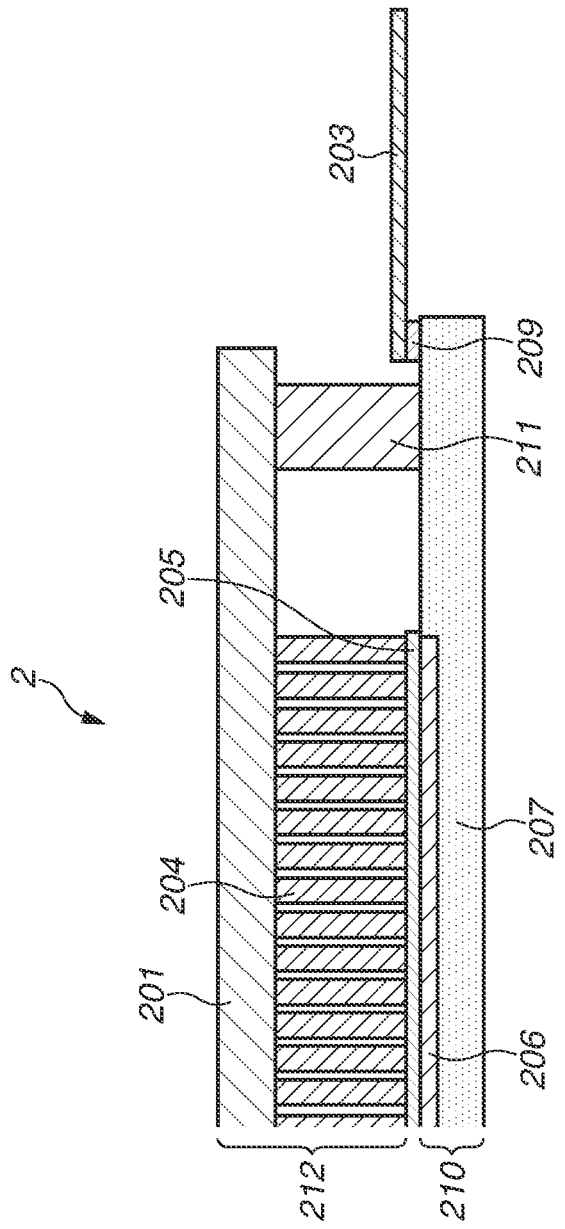
FIG. 14 is a schematic sectional view illustrating a configuration of a radiation imaging apparatus according to a comparative example 1.

FIG. 14 is a schematic sectional view illustrating a configuration of a radiation imaging apparatus 2 according to a comparative example 1. The radiation imaging apparatus 2 differs from the radiation imaging apparatus 1 in that a sealing portion 211 seals a scintillator layer 204 by connecting the edge portion of a sensor panel 210 and the edge portion of a scintillator supporting base 201.

A manufacturing method of this conventional radiation imaging apparatus 2 will be described with reference to FIG. 14. First, a photoelectric conversion unit 206, an ACF 209, and external wirings 203 are formed on a thin semiconductor film made of amorphous silicon formed on a sensor substrate 207 made of glass. The sensor panel 210 is produced by forming a sensor protection layer made of SiNx on the photoelectric conversion unit 206.

Next, the surface of the scintillator supporting base 201 made of aluminum is alumited (anodized for corrosion resistance), and thereon, the scintillator layer 204 having a columnar crystal structure made of alkali halide (for example, CsI:Tl (thallium activation cesium iodide)) is formed (vapor-deposited). After the vapor-deposition, a scintillator protection layer is formed on the scintillator layer 204, and a scintillator panel 212 is consequently produced.

Next, as the sealing portion 211, a frame made of epoxy resin is formed on the sensor panel 210. Specifically, epoxy resin is applied onto the sensor substrate 207 from a dispenser device such that the epoxy resin has a width of 2 mm and a height of 0.5 mm and surrounds two-dimensionally arranged photoelectric conversion elements 213. After the scintillator panel 212 and the sensor panel 210 are bonded to each other via an adhesion layer 205, the sealing portion 211 made of epoxy resin is cured.

A thermal cycling test was conducted on this radiation imaging apparatus 2. The thermal cycling test was conducted as follows. The radiation imaging apparatus 2 was set in an evaluation apparatus and was left for four hours in an environment in which the temperature was 50° C. and the humidity was 60%. Next, the radiation imaging apparatus 2 was left for four hours in an environment in which the temperature was −30° C. and the humidity was 0%. This cycle was repeated five times. Next, a visual evaluation was conducted to determine whether any damage (for example, a crack or peeling) had been caused to the sealing portion 211 by the thermal expansion difference between the scintillator supporting base 201 and the sensor panel 210. The evaluation indicated that the thermal cycling test damaged the sealing portion 211 of the radiation imaging apparatus 2.

Comparative Example 2

Figure 15:
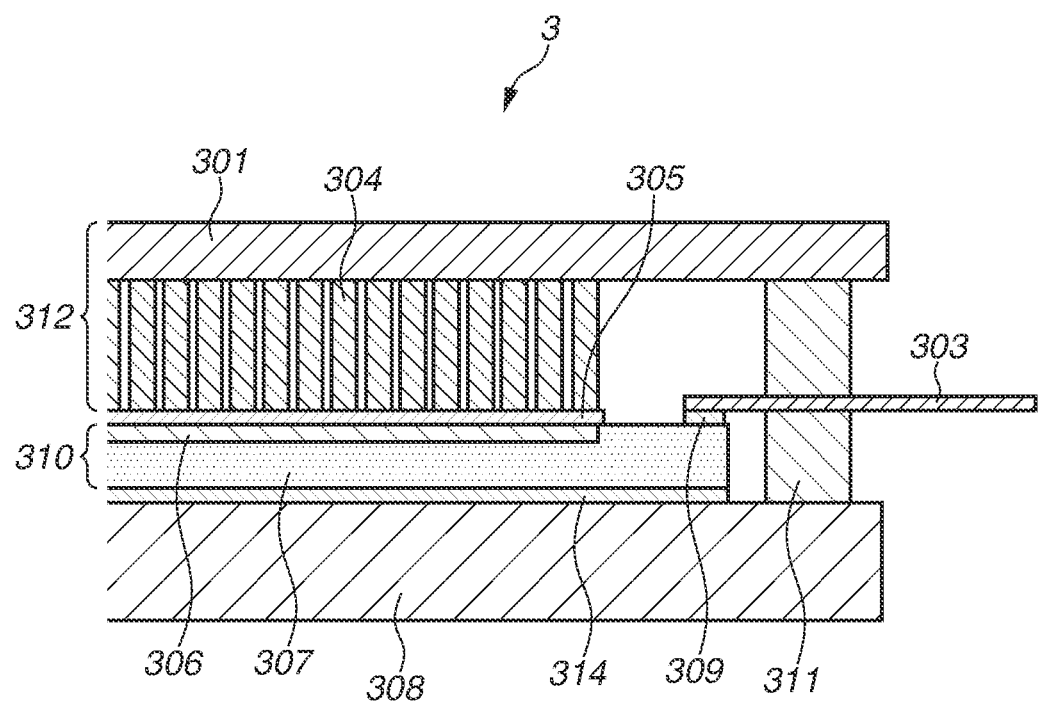
FIG. 15 is a schematic sectional view illustrating a configuration of a radiation imaging apparatus according to a comparative example 2.

FIG. 15 is a schematic sectional view illustrating a configuration of a radiation imaging apparatus 3 according to a comparative example 2. The radiation imaging apparatus 3 differs from the radiation imaging apparatus 1 in that no stress relaxation portion is formed and that a sensor panel 310 and a substrate 308 are bonded to each other via an adhesion layer. The substrate 308 is made of glass. However, as is the case with the radiation imaging apparatus 1, a sealing portion 311 of the radiation imaging apparatus 3 connects the edge portion of the substrate 308 and the edge portion of a scintillator supporting base 301.

A manufacturing method of this conventional radiation imaging apparatus 3 will be described with reference to FIG. 15. First, a photoelectric conversion unit 306, an ACF 309, and external wirings 303 are formed on the sensor substrate 307 made of silicon Si. Next, the sensor panel 310 is produced by forming a sensor protection layer made of SiNx on the photoelectric conversion unit 306. Next, the substrate 308 and the sensor panel 310 are bonded to each other via a substrate adhesion layer 314.

Next, a scintillator panel 312 is produced in the same way as the scintillator panel 212 of the radiation imaging apparatus 2. Next, as the sealing portion 311, a frame made of epoxy resin is formed on the substrate 308. Specifically, epoxy resin is applied onto the substrate 308 from a dispenser device such that the epoxy resin has a width of 2 mm and a height of 0.5 mm and surrounds the sensor panel 310. After the scintillator panel 312 and the sensor panel 310 are bonded to each other via an adhesion layer 305, the sealing portion 311 made of epoxy resin is cured.

A thermal cycling test was conducted on this radiation imaging apparatus 3. The same thermal cycling test as in comparative example 1 was conducted. A visual evaluation was conducted to determine whether any damage (for example, a crack or peeling) had been caused to the sealing portion 311 by the thermal expansion difference between the scintillator supporting base 301 and the sensor panel 310. The evaluation indicated that the thermal cycling test damaged the sealing portion 311 of the radiation imaging apparatus 3.

Exemplary Embodiment

As in the comparative example 2, a scintillator panel 112 and the sensor panel 110 are formed. The scintillator panel 112 and the sensor panel 110 are bonded to each other by the adhesion layer 105 as illustrated in FIG. 2. The substrate 108 made of aluminum is disposed under the sensor panel 110.

The substrate 108 and the sensor panel 110 are not bonded to each other.

Next, the sealing portion 111 is formed such that the sensor base 107 and the substrate 108 are attached to each other. At this point, the sealing portion 111 does not come into contact with the sensor panel 110. The above-described thermal cycling test was conducted on the radiation imaging apparatus 1 produced as described above. The evaluation indicated that the thermal cycling test did not damage the sealing portion 111 of the radiation imaging apparatus 1.

Another Exemplary Embodiment

The radiation imaging apparatus according to the above exemplary embodiment is applicable to a radiation imaging system. The radiation imaging system incudes, for example, a radiation imaging apparatus, a signal processing unit including an image processor or the like that processes a signal from the radiation imaging apparatus, a display unit including a display or the like that displays a signal from the signal processing unit, and a radiation source that generates radiation.

Figure 16:
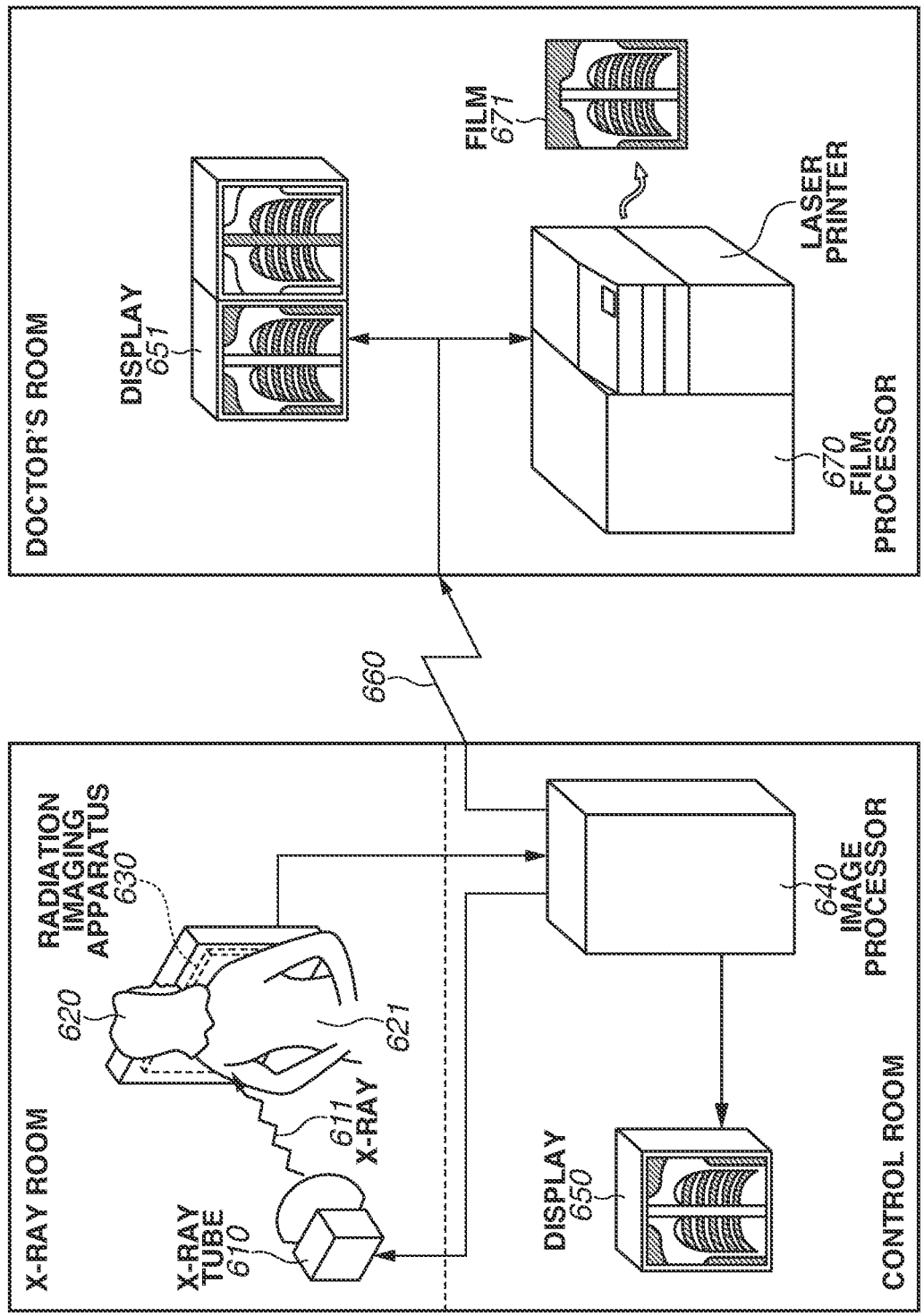
FIG. 16 illustrates a configuration of a radiation imaging system that uses the radiation imaging apparatus according to the exemplary embodiment of the present disclosure.

For example, as illustrated in FIG. 16, an X-ray 611 generated by an X-ray tube 610 passes through a chest portion 621 of a subject 620 such as a patient and enters a radiation imaging apparatus 630. The incident X-ray includes information about the inside of the body of the subject 620. The scintillator emits light based on the incident X-ray, and the sensor panel detects the light and obtains electrical information.

Next, the information is converted into a digital signal, and an image processor 640 (a signal processing unit) performs image processing on the digital signal. The resultant information is displayed on a display 650 (a display unit) in a control room. The information may be transferred to a remote area by transmission processing means including a network 660 such as telephone, a local area network (LAN), or the Internet, for example. As a result, the information can be displayed on a display 651 in a doctor's room or the like at a different location, and a doctor at the remote area can make a diagnosis.

The information can be stored in an optical disc, for example. Additionally or alternatively, the information can be stored in a recording unit such as a film 671 by a film processor 670.

Although suitable exemplary embodiments of the present disclosure have thus been described, the present disclosure is not of course limited to these exemplary embodiments. Various variations and modifications can be made within the gist of the present disclosure.

The exemplary embodiments of the present disclosure can provide a radiation imaging apparatus that can acquire high-quality radiation images at low cost and with a simple structure while ensuring the moisture resistance of the scintillator.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-010276, filed Jan. 26, 2022, which is hereby incorporated by reference herein in its entirety.

What is claimed is:

1. A radiation imaging apparatus including a scintillator layer configured to convert radiation into light, a supporting base configured to support the scintillator layer, a sensor panel including a plurality of photoelectric conversion elements arranged in a two-dimensional array, and a substrate, the radiation imaging apparatus comprising:
a sealing portion configured to seal the sensor panel and the scintillator layer in a space formed between the substrate and the supporting base,
wherein the supporting base is made of metal, and a main material of the supporting base is same as a main material of the substrate, and
wherein a linear expansion coefficient of the supporting base is in a range from $10 \times 10^{-6}$ K to $30 \times 10^{-6}$ K.

2. A radiation imaging apparatus including a scintillator layer configured to convert radiation into light, a supporting base configured to support the scintillator layer, a sensor panel including a plurality of photoelectric conversion elements arranged in a two-dimensional array, and a substrate, the radiation imaging apparatus comprising:
a sealing portion configured to seal the sensor panel and the scintillator layer in a space formed between the substrate and the supporting base,
wherein the sensor panel has flexibility.

3. The radiation imaging apparatus according to claim 1, wherein the scintillator layer is fixed to the supporting base.

4. The radiation imaging apparatus according to claim 1, wherein the scintillator layer is fixed to the sensor panel.

5. The radiation imaging apparatus according to claim 1, wherein aluminum is a main material of the supporting base.

6. The radiation imaging apparatus according to claim 1, wherein the scintillator layer is made of cesium iodide.

7. The radiation imaging apparatus according to claim 1, wherein the sealing portion is made of resin.

8. The radiation imaging apparatus according to claim 7, wherein the resin is epoxy resin.

9. A radiation imaging system comprising:
the radiation imaging apparatus according to claim 1;
a signal processing unit configured to process a signal from the radiation imaging apparatus; and
a display unit configured to display a signal from the signal processing unit.

10. A radiation imaging apparatus including a scintillator layer configured to convert radiation into light, a supporting base configured to support the scintillator layer, a sensor panel including a plurality of photoelectric conversion elements arranged in a two-dimensional array, and a substrate, the radiation imaging apparatus comprising:
a sealing portion configured to seal the sensor panel and the scintillator layer in a space formed between the substrate and the supporting base,
wherein the supporting base is made of metal, and a main material of the supporting base is same as a main material of the substrate, and
wherein the substrate and the sensor panel are not bonded to each other.

11. A radiation imaging apparatus including a scintillator layer configured to convert radiation into light, a supporting base configured to support the scintillator layer, a sensor panel including a plurality of photoelectric conversion elements arranged in a two-dimensional array, and a substrate, the radiation imaging apparatus comprising:
a sealing portion configured to seal the sensor panel and the scintillator layer in a space formed between the substrate and the supporting base; and
a stress relaxation layer disposed between the substrate and the sensor panel and configured to relax stress caused between the substrate and the sensor panel,
wherein the supporting base is made of metal, and a main material of the supporting base is same as a main material of the substrate.

12. The radiation imaging apparatus according to claim 2, wherein the sensor panel is made of polyimide.

* * * * *